(12) United States Patent
Noui et al.

(10) Patent No.: US 12,360,377 B2
(45) Date of Patent: Jul. 15, 2025

(54) LIGHT PROJECTOR MODULE

(71) Applicant: TriLite Technologies GmbH, Vienna (AT)

(72) Inventors: Louahab Noui, East Sussex (GB); Joerg Reitterer, Brunn am Gebirge (AT)

(73) Assignee: TriLite Technologies GmbH, Vienna (AT)

( * ) Notice: Subject to any disclaimer, the term of this patent is extended or adjusted under 35 U.S.C. 154(b) by 0 days.

(21) Appl. No.: 18/234,994

(22) Filed: Aug. 17, 2023

(65) Prior Publication Data

US 2024/0069349 A1 Feb. 29, 2024

(30) Foreign Application Priority Data

Aug. 23, 2022 (EP) ..................................... 22191735

(51) Int. Cl.
| | | |
|---|---|---|
| F21V 8/00 | (2006.01) | |
| G02B 26/08 | (2006.01) | |
| G02B 27/01 | (2006.01) | |
| G02B 27/14 | (2006.01) | |

(52) U.S. Cl.
CPC ....... *G02B 27/0172* (2013.01); *G02B 6/0016* (2013.01); *G02B 6/0031* (2013.01); *G02B 6/0036* (2013.01); *G02B 26/0833* (2013.01); *G02B 27/144* (2013.01); *G02B 6/0073* (2013.01); *G02B 2027/013* (2013.01); *G02B 2027/0178* (2013.01)

(58) Field of Classification Search
CPC .......................... G02B 6/0031; G02B 6/0036; G02B 26/0833; G02B 27/0172; G02B 2027/0178; G02B 2027/013; G02B 6/10; G02B 6/12016
See application file for complete search history.

(56) References Cited

U.S. PATENT DOCUMENTS

| | | | |
|---|---|---|---|
| 2018/0082644 A1* | 3/2018 | Bohn | ...................... G02B 6/003 |
| 2019/0265486 A1* | 8/2019 | Hansotte | .............. G02B 6/0016 |
| 2022/0163790 A1 | 5/2022 | Adema | |
| 2022/0197034 A1 | 6/2022 | Noui et al. | |
| 2022/0299758 A1* | 9/2022 | Adema | .............. G02B 27/0966 |

OTHER PUBLICATIONS

European Patent Office Search Report corresponding to Application No. 22191735.4-1020, dated Feb. 17, 2023.

* cited by examiner

*Primary Examiner* — Dennis P Joseph
(74) *Attorney, Agent, or Firm* — Hoffman & Baron, LLP

(57) ABSTRACT

A light projector module comprises a support, a light source for emitting in a beam path a light beam, a micro-electro-mechanical-system (MEMS) mirror for deflecting the emitted light beam, a waveguide having an in-coupling area for receiving the deflected light beam and an out-coupling area for projecting the deflected light beam with enlarged cross section, and a static mirror in the beam path from the light source to the MEMS mirror to fold the beam path about an angle of folding. The static mirror lies beside the first side of the waveguide.

12 Claims, 2 Drawing Sheets

LIGHT PROJECTOR MODULE

CROSS-REFERENCE TO RELATED APPLICATIONS

This application claims priority to the European Patent Application No. 22 191 735.4 filed Aug. 23, 2022, the disclosure of which is incorporated herein by reference.

TECHNICAL FIELD

The present disclosed subject matter relates to a light projector module for projecting an image.

BACKGROUND

An apparatus of this kind, as disclosed in EP 4 020 058 A1 of the same applicant, is commonly used in AR glasses, AR helmets or head-up displays for a broad range of applications like navigation, training, entertainment, education or work. A MEMS mirror deflects the light beam into subsequent directions (angles), one direction (angle) per pixel of the image. For example, the MEMS mirror oscillates fast about a vertical axis and slowly about a horizontal axis to sweep the directions and, thus, scan the pixels row by row and line by line. The deflected light beam passes a waveguide which enlarges the beam in cross-section—for a so-called "exit pupil" or "eye box" expansion—onto the display area viewed by the user.

In VR applications, the display area is typically a (miniature) reflective screen in front of the user's eye. In AR applications the display area is a semi-transparent combiner which redirects the light beam/s towards the user's eye while concurrently superposing them with light field from a surrounding. In either case the cornea and the lens of the user's eye focus each light beam from a specific direction onto one image point on the retina, so that all image points on the retina then form the image perceived by the user. In head mounted displays the light projector may even project the scanned light beam/s directly into the user's eye, without any reflective screen or semi-transparent combiner. In video beamer applications the light projector module can be used to project an image onto an external screen like a reflective wall or movie screen.

For light projector modules used in VR or AR glasses, helmets and other head-mounted displays it is desirable to build the module as small as possible to increase user comfort and wearability. Also in portable video beamers miniaturisation is key.

BRIEF SUMMARY

It is thus an object of the present disclosed subject matter to provide a light projector module which is as compact as possible for optimal wearability and portability.

This object is achieved with a light projector module for projecting an image, comprising:
- a support;
- a light source supported by the support and configured to emit in a beam path a light beam carrying said image;
- a micro-electro-mechanical-system (MEMS) mirror supported by the support and configured to deflect the emitted light beam received over the beam path as a deflected light beam;
- a waveguide supported by the support and having two parallel sides, the first side having an in-coupling area for receiving the deflected light beam and the second side having an out-coupling area for projecting the deflected light beam with enlarged cross section; and
- a static mirror in the beam path from the light source to the MEMS mirror to fold the beam path about an angle of folding;
wherein the static mirror lies beside said first side of the waveguide.

The disclosed arrangement of the light source, static mirror, MEMS mirror and waveguide leads to a tight integration and compact design while guiding the light beam in an optimised path through the module. In particular, the angle of incidence of the light beam onto the MEMS mirror—as measured with respect to a normal onto the mirror plane—can be minimised to minimise geometrical distortions, without increasing installation space. The light projector module of the disclosed subject matter is therefore particularly suited for integration into VR and AR devices and miniaturised beamers.

For a particularly compact design, the static mirror optionally overlaps the out-coupling area when seen in a direction substantially perpendicular to the first and second sides of the waveguide.

In an optional embodiment, the angle of folding is in the range of 45° to 75°, e.g., about 60°. When the MEMS mirror is configured to oscillate about a resting position the folded beam path may optionally impinge on the MEMS mirror in the resting position under an angle of incidence of 15° to 45°, e.g., about 30°. Both measures, individually and in particular when combined, yield a tightly integrated design while meeting the operating constraints of the MEMS mirror.

In a further optional embodiment of the disclosed subject matter the waveguide comprises a transparent cover arranged at a distance from the first side of the waveguide and the static mirror is mounted on the transparent cover. In this way, the transparent cover, e.g. a thin glass plate used to protect the waveguide while maintaining the air gap necessary for total internal reflection within the waveguide to work, is co-used as a support for the static mirror. The transparent cover is at the optimum position for folding the beam path, contributing to the miniaturisation of the design.

The static mirror can be mounted on either side of the transparent cover as long as its reflective side faces away from the waveguide. It is, however, advantageous when the mirror is mounted on that side of the transparent cover that faces away from the first side of the waveguide so that it is directly exposed to the beam path, i.e., the light beam does not need to pass through the transparent cover to reach the static mirror.

The transparent cover could be mounted directly on the support. Optionally, the transparent cover and the waveguide are attached to one another via a circumferential rim or set of studs. This ensures the necessary air gap between the transparent cover and the waveguide on the one hand, and on the other hand only one structure, that is the transparent cover carrying the static mirror and the attached waveguide, needs to be aligned with respect to the support and all other components carried by the support.

According to a further optional feature of the disclosed subject matter the support is a housing enclosing at least the light source, the MEMS mirror, the waveguide, and the static mirror, wherein the housing has a window exposing the out-coupling area of the waveguide. Such housing may be directly attached to or integrated into a temple of a spectacle frame. A particularly slim design is achieved when the beam path from the light source to the static mirror runs substantially parallel to the longitudinal axis of the temple.

In all embodiments the light source may comprises three LEDs or laser diodes for emitting red, green, and blue beams of light, respectively, and a beam combiner for combining the beams of light to said light beam, to project a colour image.

BRIEF DESCRIPTION OF THE DRAWINGS

The disclosed subject matter will now be described by means of exemplary embodiments thereof with reference to the enclosed drawings, in which show.

DETAILED DESCRIPTION

Figure 1:
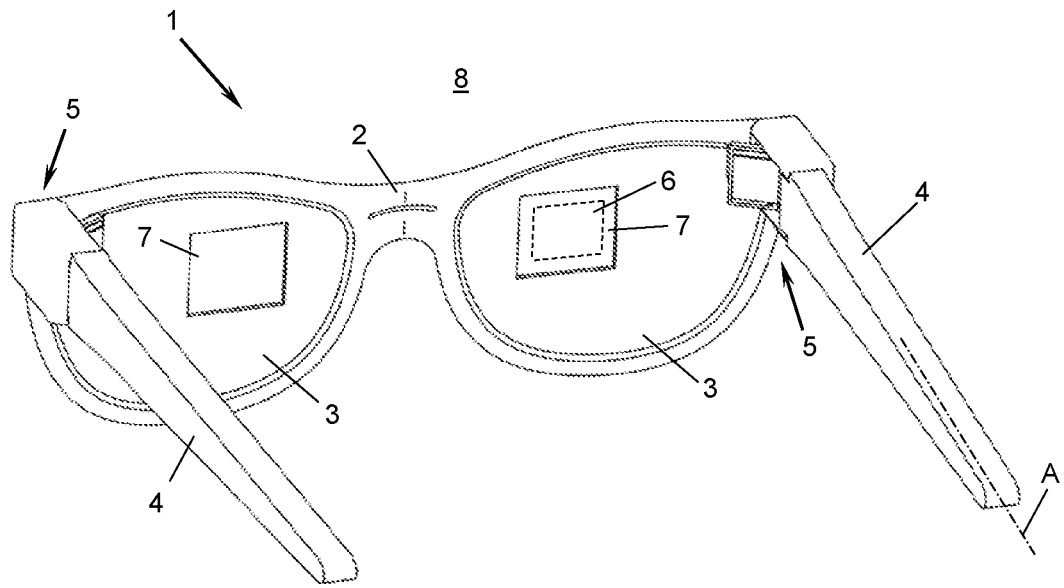
FIG. 1 the light projector module of the disclosed subject matter integrated into a pair of AR glasses in a perspective view.

FIG. 1 shows a pair of augmented reality (AR) glasses 1 comprising a spectacle frame 2, a pair of eye glasses 3 and a pair of temples 4. Attached to each temple 4 is a light projector module 5 which projects an image 6 onto a semi-transparent combiner 7. The semi-transparent combiner 7 is supported by the spectacle frame 2 or an eyeglass 3 or integrated into the latter. The semi-transparent combiner 7, e.g., a waveguide or a holographic combiner, superposes the image 6 projected by the light projector module 5 with the light field from a surrounding 8 so that the wearer of the AR glasses 1 can see the image 6 overlaying ("augmenting") the surrounding 8.

The image 6 can, e.g., be monochromatic or coloured, a single image or part of a video sequence of images. The image/s 6 can augment any surrounding 8 such as a landscape, an urban environment, a road, a classroom, a workplace etc. so that the user can perceive additional information, e.g., for navigation, work, education, training or entertainment as an overlay ("AR image") of the light field ("view") of the surrounding 8.

In the example of FIG. 1, the light projector module 5 (here: two modules 5, one per temple 4) is built into AR glasses and used in combination with a semi-transparent combiner 7. A similar application of the light projector module 5 could be in an AR helmet worn by a user, a handheld AR device like a smartphone with a camera, or an AR head-up display for a vehicle which all use a semi-transparent combiner 7 as the display area of the light projector module 5. If desired, suitable relay optics can be interposed between the light projector module 5 and the semi-transparent combiner 7.

Instead of the semi-transparent combiner 7 the light projector module 5 could be used with any other display area, e.g., a conventional reflective projection screen such as a miniature screen mounted on the frame 2 of virtual reality (VR) glasses, or a projection wall or a movie screen, for example when the light projector module 5 is used as a miniature (or full-scale) video beamer. The light projector module 5 could even be used to project the image 6 directly into the user's eye, optionally with suitable optics therebetween.

Figure 2:
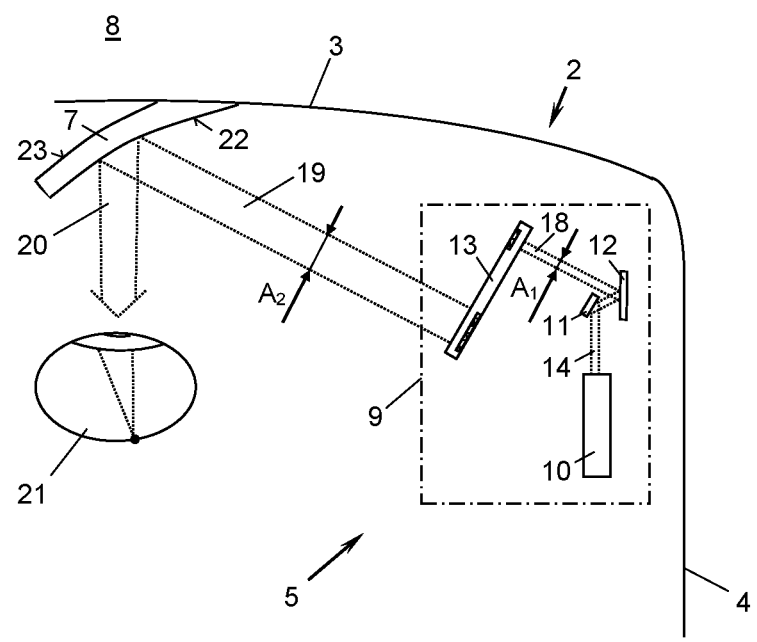
FIG. 2 the electro-optical components of the light projector module of FIG. 1 in a schematic top view.
Figure 3:
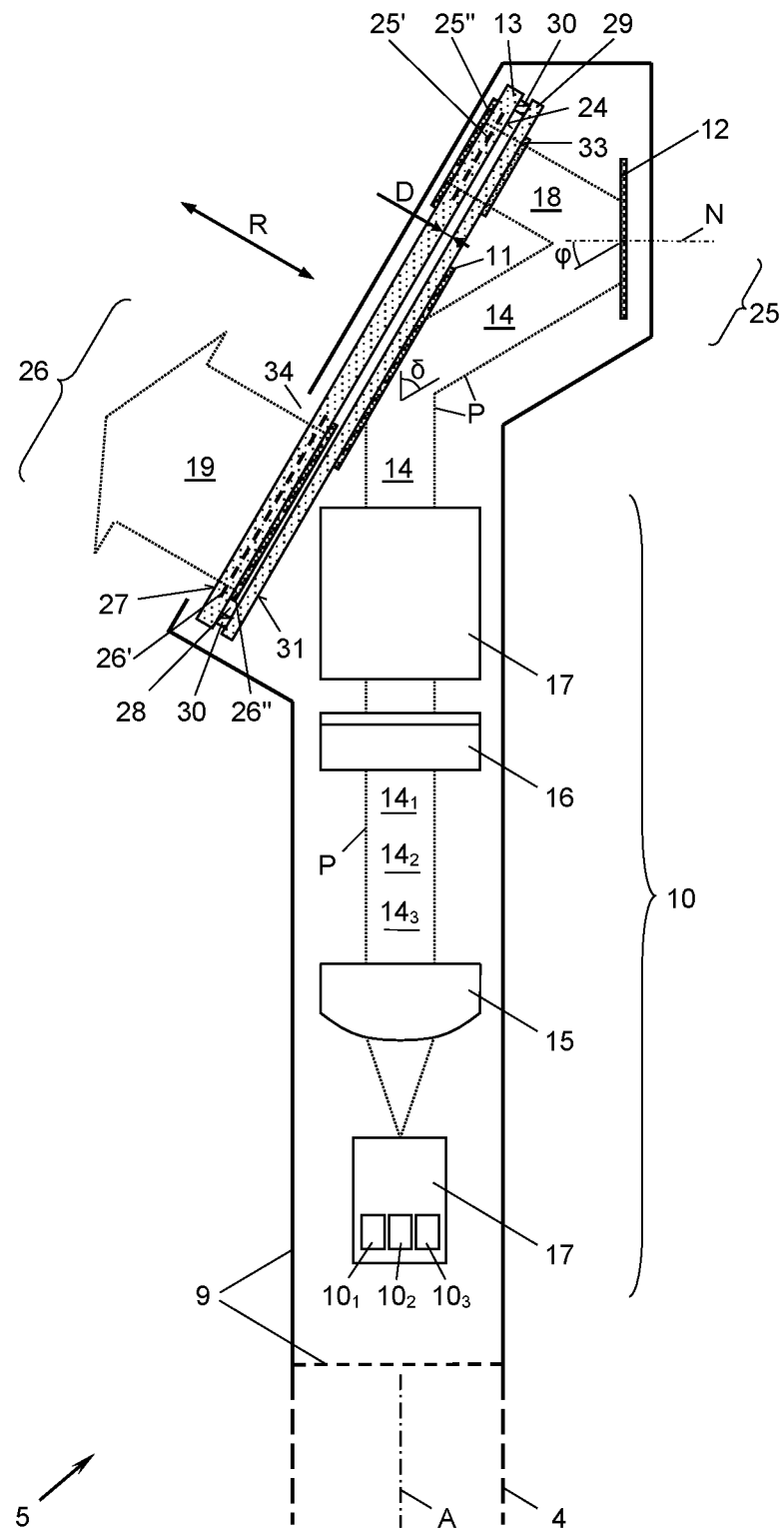
FIG. 3 the light projector module of FIGS. 1 and 2 in a sectional top view.

The light projector module 5 can be built into a separate housing 9, illustrated in FIGS. 2 and 3 by solid lines and the horizontal broken line, or be directly integrated into the spectacle frame 2 or one of its temples 4, i.e., use the spectacle frame 2 or a temple 4 as its housing 9.

As shown in FIGS. 2 and 3, the housing 9 forms a support for the primary components of the light projector module 5, that are: a light source 10, a static mirror 11, a micro-electro-mechanical-system (MEMS) mirror 12, and a waveguide 13.

The light source 10 emits a collimated light beam 14 which carries the image 6 in a time-multiplexed manner, i.e. the intensity values of the image pixels one after the other, e.g., row-by-row and line-by-line per image 6 comprised of a grid of pixels, and image-by-image per video comprised of a sequence of images 6.

For this purpose the light source 10 can be of any type known in the art configured to emit a collimated light beam 14. In most embodiments, the light source 10 is a semiconductor light source such as a light emitting diode (LED), microLED (µLED), or laser diode, e.g., edge-emitting laser diode or surface-emitting laser diode. For colour images 6, the light source 10 may be a polychromatic light source 10, e.g., comprise three LEDs or laser diodes $10_1$, $10_2$, $10_3$ of the three primary colours red, green and blue which emit a red, green and blue beam of light $14_1$, $14_2$, $14_3$, respectively, that are fed—e.g. via lenses 15, 16—to a beam combiner 17 that combines the beams $14_1$, $14_2$, $14_3$ to the light beam 14. The lenses 15, 16 may be common to all beams $14_1$, $14_2$, $14_3$ or comprise one or more individual lense/s (not shown) for each beam $14_1$, $14_2$, $14_3$.

The beam path P of the light beam 14 downstream of the light source 10, drawn in dotted lines in FIGS. 2 and 3, is folded (diverted) by an angle of folding δ, here: away from the user towards the outside of the temple 4. The angle of folding δ is in the range of 45° to 75° and in the present example about 60°.

Downstream of the static mirror 11 the folded beam path P with the light beam 14 impinges on the MEMS mirror 12. The MEMS mirror 12 deflects the light beam 14 as a (collimated) "deflected" light beam 18 into subsequent directions (angles), one direction per pixel of the image 6, towards the waveguide 13. The MEMS mirror 12 can, e.g., oscillate fast about a vertical axis and slowly about a horizontal axis to sweep the directions and, thus, reproduce the pixels of an image 6 row-by-row and line-by-line, and image-by-image for a sequence of images 6. Alternatively, the MEMS mirror 12 can sweep ("scan") the directions by any other movement, e.g., by means of Lissajous curves, to reproduce the image/s 6.

The MEMS mirror 12 has a resting position (shown in FIG. 3) about which it oscillates, and the folded beam path P of the light beam 14 impinges on the MEMS mirror 12 in that resting position under an angle of incidence φ of 15° to 45°, in the present example about 30°. The angle of incidence φ is measured with respect to a normal N on the mirror plane of the MEMS mirror 11.

The waveguide 13 receives the deflected light beam 18 from the MEMS mirror 12 and guides it towards the semi-transparent combiner 7. On its way through the waveguide 13 the deflected light beam 18 is expanded (enlarged) in its cross section so that it exits the waveguide 13 as an "expanded" light beam 19 with a cross section $A_2$ which is larger than the cross section $A_1$ of the deflected light beam 18. For example, the cross sections $A_1$, $A_2$ of the deflected and expanded light beams 18, 19 can be 0.5-4 mm² and 8-150 mm², respectively.

Downstream of the waveguide 13, the semitransparent combiner 7 redirects the expanded light beam 19 as an "image" light beam 20 towards the user's eye 21 for superposing the image 6 with the light field of the surrounding 8. To this end, the semitransparent combiner 7 not only re-directs the expanded light beam 19 impinging on its one side 22 facing the user's eye 21 but also lets pass the light field of the surrounding 8 impinging on its opposite side 23, i.e., its far side with respect to the eye 21, so that the user perceives both the AR image 6 as well as the surrounding 8.

FIG. 3 shows the arrangement of the components light source 10, static mirror 11, MEMS mirror 12 and waveguide 13 on the support, here: the housing 9. As discussed before, the housing 9 can be the temple 4 itself or any other structure, even a lattice- or scaffold-like structure.

To achieve a slim and compact design of the module 5 while keeping the angle of incidence p on the MEMS mirror 12 as low as possible, the space underneath the rear side of the waveguide 13 is used as a mounting position for the static mirror 11. This allows the beam path P from the light source 10 to the static mirror 11 to run substantially parallel to the longitudinal axis A of a temple 4 when the module 5 is used in AR or VR glasses, yielding a slim design. And—with the above-mentioned ranges of angle of folding δ and angle of incidence μ—the expanded light beam 19 will exit towards the semi-transparent combiner 7 in a slightly oblique direction from the temple 4 to the eye glass 3, as shown in FIG. 2.

The rear side of the waveguide 13 where the static mirror 11 lies is that side 24 of the waveguide 13 that has an in-coupling area 25 for receiving the deflected light beam 18 from the MEMS mirror 12. The out-coupling area 26 of the waveguide 13 is larger than the in-coupling area 25, roughly by the enlargement ratio $A_2:A_1$, and lies on the opposite side 27 of the waveguide 13. Due to the internal waveguiding structure of the waveguide 13 the in-coupling are 25 and the out-coupling area 26 do not overlap when seen in a direction R substantially perpendicular to the sides 24, 27. Therefore, there is installation space available beside the side 24 of the waveguide 13 in a region underneath the out-coupling area 26 for mounting the static mirror 11.

The static mirror 11 therefore lies beside the side 24 in a region where it will overlap the out-coupling area 26 when seen in the direction R, for optimal compactness of the design. However, in other embodiments, the static mirror 11 may not overlap the out-coupling area 26 when seen in the direction R.

As shown in FIG. 3, the static mirror 11 can be mounted substantially parallel to the side 24 of the waveguide 13, although this is not obligatory. An air gap 28 should remain at the side 24 of the waveguide 13 so that its internal waveguiding function can work properly with total internal reflection at that side 24. The air gap 28 may be established, e.g., by mounting the static mirror 13 at least at a distance D from the side 24. The distance D may be in the range of several hundred microns or millimetres.

The in-coupling section 25 may be formed by a diffraction grating 25' which diffracts the deflected light beam 18 mainly into one diffraction order, e.g., into the first diffraction order to couple the deflected light beam 18 under an angle above the critical angle of total internal reflection into the waveguide 13. Instead of the diffraction grating 25' any other optical element for coupling the deflected light beam 18 under said angle into the waveguide 1 section 13 may be employed such as a prism, a fibre, etc.

The waveguide internally guides the in-coupled deflected light beam 18 via a series of successive total internal reflections between its sides 24, 27 towards the out-coupling section 26, which may be in form of an out-coupling diffraction grating 26'. Instead of the diffraction grating 26' any other optical element for coupling the enlarged light beam 19 out from the waveguide 13 may be employed as out-coupling section 26 such as one or several semitransparent mirrors, a multitude of successive micro-mirrors, one or more prisms, fibres, etc.

Any or both of the diffraction gratings 25', 26' can be applied into or onto the waveguide 13 by e.g., etching, pressing or moulding surface structures like steps, grooves, ridges etc., or embedded into the waveguide 13, e.g., in the form of structured voids or reflective films. Moreover, any or both of the diffraction gratings 25', 26' can be a reflection or a transmission grating. In optional embodiments, the waveguide 13 has a mirror 25" behind the in-coupling diffraction grating 25', i.e., at its far side with respect to the input light beam 18, and/or reflectorised sides 24, 27 between the in- and out-coupling areas 25, 26, and/or a mirror 26" behind the out-coupling diffraction grating 26', i.e., at its far side with respect to the output light beam 19. In all these embodiments the mirrors 25", 26" could also be distanced from the corresponding side 24, 27, e.g., by an air gap of a few microns or more.

In some embodiments, the waveguide 13 will be provided with a transparent cover 29, e.g. a thin glass plate, which is mounted at said distance D from the side 24 to protect the waveguide 13 while establishing the air gap 28. The transparent cover 29 and the waveguide 13 can be attached to one another via a circumferential rim (not shown) or a set of spacers or studs 30.

The transparent cover 29 can be mounted in the housing 9 and carry the waveguide 13. The static mirror 11 could be mounted in the shown position directly on the support or housing 9. In the shown embodiment the transparent cover 29 is co-used to mount the static mirror 11, e.g., by covering one of the sides of the transparent cover 29 with a reflective coating as static mirror 11. In particular, the side 31 of the transparent cover 29 that faces away from the side 24 of the waveguide 13 can be used to support the static mirror 11, for example by coating that side 31 with a reflective coating.

The static mirror 11 should not cover the in-coupling area 25 of the waveguide 13. In the region of the in-coupling area 25 the transparent cover 29 can be provided with an anti-reflective coating 33 to further the entering of the deflected light beam 18 into the waveguide 13.

The housing 9 is configured to support and optionally enclose the light source 10, the static mirror 11, the MEMS mirror 12, the waveguide 13, and the optional transparent cover 29. The housing 9 may have a window 34 exposing the out-coupling area 26 of the waveguide 13 so that the enlarged light beam 19 can exit the housing 9. The window 34 may be provided with a further transparent cover such as a glass plate.

The disclosed subject matter is not restricted to the specific embodiments described in detail herein, but encompasses all variants, modifications and combinations thereof that fall within the scope of the appended claims.

What is claimed is:

1. A light projector module for projecting an image, comprising:
   a support;
   a light source supported by the support and configured to emit in a beam path a light beam carrying said image;
   a 2D scanning micro-electro-mechanical-system (MEMS) mirror supported by the support and configured to rotationally oscillate about a vertical axis and to rotationally oscillate about a horizontal axis to deflect the emitted light beam received over the beam path as a deflected light beam;
   a waveguide supported by the support and having two parallel sides, a first side of the parallel sides having an in-coupling area for receiving the deflected light beam and a second side of the parallel sides, opposite the first side, having an out-coupling area for projecting the deflected light beam with enlarged cross section, so that the deflected light beam is received by the in-coupling area on the first side of the waveguide and projected by the out-coupling area on the second opposite side of the waveguide; and a non-scanning, non-rotatable mirror fixedly mounted in the beam path between the light source and the 2D scanning MEMS mirror to fold the beam path about a constant angle of folding;

wherein the non-scanning, non-rotatable mirror is fixedly mounted adjacent and substantially parallel to the first side of the waveguide.

2. The light projector module of claim 1, wherein the non-scanning, non-rotatable mirror overlaps the out-coupling area when seen in a direction substantially perpendicular to the first and second sides of the waveguide.

3. The light projector module of claim 1, wherein the angle of folding is in the range of 45° to 75°.

4. The light projector module of claim 1, wherein the MEMS mirror is configured to oscillate about a resting position and the folded beam path impinges on the MEMS mirror in the resting position under an angle of incidence of 15° to 45°.

5. The light projector module of claim 1, wherein the waveguide comprises a transparent cover arranged at a distance from the first side of the waveguide and the non-scanning, non-rotatable mirror is mounted on the transparent cover.

6. The light projector module of claim 5, wherein the non-scanning, non-rotatable mirror is mounted on that side of the transparent cover that faces away from the first side of the waveguide.

7. The light projector module of claim 5, wherein the transparent cover and the waveguide are attached to one another via a circumferential rim or set of studs.

8. The light projector module of claim 1, wherein the support is a housing enclosing at least the light source, the 2D scanning MEMS mirror, the waveguide, and the non-scanning, non-rotatable mirror, and wherein the housing has a window exposing the out-coupling area of the waveguide.

9. The light projector module of claim 8, wherein the housing is attached to or integrated into a temple of a spectacle frame.

10. The light projector module of claim 9, wherein the beam path from the light source to the non-scanning, non-rotatable mirror runs substantially parallel to a longitudinal axis of the temple.

11. The light projector module of claim 1, wherein the angle of folding is about 60°.

12. The light projector module of claim 1, wherein the 2D scanning MEMS mirror is configured to oscillate about a resting position and the folded beam path impinges on the 2D scanning MEMS mirror in the resting position under an angle of incidence of about 30°.

* * * * *